(12) United States Patent
Conner et al.

(10) Patent No.: US 7,756,050 B2
(45) Date of Patent: Jul. 13, 2010

(54) METHOD TO PROVIDE UNEQUAL ERROR PROTECTION AND UNEQUAL ERROR DETECTION FOR INTERNET PROTOCOL APPLICATIONS

(75) Inventors: Keith Faulk Conner, Boonton, NJ (US); Anil M Rao, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 776 days.

(21) Appl. No.: 11/118,815

(22) Filed: Apr. 29, 2005

(65) Prior Publication Data

US 2006/0245417 A1  Nov. 2, 2006

(51) Int. Cl.
H04J 1/16 (2006.01)
H04L 12/56 (2006.01)
(52) U.S. Cl. ................. 370/252; 370/278; 370/328
(58) Field of Classification Search ........... 370/310.2, 370/340, 466, 467, 252, 328, 329, 278, 282; 709/220–224; 375/222
See application file for complete search history.

(56) References Cited

U.S. PATENT DOCUMENTS

| | | | | |
|---|---|---|---|---|
| 5,684,791 | A * | 11/1997 | Raychaudhuri et al. | 370/310.2 |
| 2002/0064167 | A1* | 5/2002 | Khan et al. | 370/410 |
| 2003/0039224 | A1* | 2/2003 | Koo et al. | 370/328 |
| 2006/0274706 | A1* | 12/2006 | Chen et al. | 370/340 |

FOREIGN PATENT DOCUMENTS

| | | |
|---|---|---|
| EP | 0936772 | 8/1999 |
| WO | WO 2004098118 | 11/2004 |
| WO | PCT/US2006/012685 | 8/2006 |

OTHER PUBLICATIONS

A. Servetti et al, "Link-Level Unequal Error Detection For Speech Transmission Over 802.11 Networks", Proceedings of Workshop on DSP in Mobile and Vehicular Systems (SWIM), Retrieved from the Internet: URL:http://media.polito.it/files/servettti_swim2004.pdf, Jan. 2004, pp. 1-6.

C. W. Yung et al, "Unequal Error Protection For Wireless Transmission of MPEG Audio", Circuits and Systems, 1999, ISCAS '99, Proceedings of the 1999 IEEE International Symposium on Orlando, FL, USA May 30-Jun. 2, 1999, pp. 342-345.

* cited by examiner

Primary Examiner—John Pezzlo

(57) ABSTRACT

A method and system for providing Voice over Internet Protocol (VoIP) in a wireless communications system using a Packet Data Conversion Protocol (PDCP) with enhanced functionality that allows sub-packets to be processed for transmission over different Radio Bearers (RB) with unequal or different levels of error protection and/or error detection based on perceptual importance of the bits in the sub-packets. The enhanced PDCP being operable to partition a packet into a plurality of sub-packets such that different levels of error protection and/or error detection may be applied to the packet. An overall gain in system capacity can be expected due to transmit power savings provided via unequal error detection and error protection.

4 Claims, 4 Drawing Sheets

METHOD TO PROVIDE UNEQUAL ERROR PROTECTION AND UNEQUAL ERROR DETECTION FOR INTERNET PROTOCOL APPLICATIONS

FIELD OF THE INVENTION

The present invention relates generally to Internet Protocol applications and, in particular, to Voice over Internet Protocol (VoIP) in a wireless communication system.

BACKGROUND OF THE INVENTION

As demand grows for enabling Voice over Internet Protocol (VoIP) in third generation (3G) wireless communication systems, such as the well-known Universal Mobile Telecommunications System (UMTS), service providers need to ensure that speech quality of VoIP in the Packet Switched (PS) domain is comparable to existing Circuit Switched (CS) voice technology while being cognizant of any adverse effects VoIP may have on system capacity.

FIG. 1 depicts a UMTS based wireless communications system 100, internet 105 and a VoIP phone 110. Wireless communications system 100 comprises at least Gateway Gprs Support Node (GGSN) 120, core network 130 and User Equipment (UE) 140. GGSN 120 being an interface between internet 105 and core network 130. Core network 130 includes Mobile Switching Center (MSC) 150, Radio Access Network (RAN) 160, Radio Network Controller (RNC) 170 and Node B 180. It should be noted that alternate network architectures may implement similar functionality.

FIG. 2 depicts a protocol stack 200 used for a VoIP call between VoIP phone 110 and UE 140 in accordance with the prior art. In some system deployments, VoIP phone 110 may be an electronic device that converts a Public Switched Telephone Network (PSTN) call into a VoIP call, or a PSTN or wireless network may have an inter-working function (IWF) or media gateway (MGW) that converts a PSTN call into a VoIP call. The VoIP call being processed in the PS domain of UMTS-based wireless communications system 100. As shown in FIG. 2, protocol stack 200 includes an Adaptive Multi-Rate (AMR) layer 205, a Real Time Protocol/Real Time Control Protocol (RTP/RTCP) layer 210, an User Datagram Protocol/Internet Protocol version 6 (UDP/IPv6) layer 215, a Packet Data Convergence Protocol (PDCP) layer 220, a Radio Link Control (RLC) layer 225, a dedicated channel Medium Access Control (MAC-d) layer 230, and a Physical (PHY) layer 235. AMR layer 205, RTP/RTCP layer 210 and UDP/IPv6 layer 215 being implemented at VoIP phone 110. PDCP layer 220 being implemented at RAN 160. RLC layer 225 and MAC-d layer 230 being implemented at RNC 170. And PHY layer 235 being implemented at Node B 180. Note that although UDP/IPv6 layer 215 is being shown as a single layer, its actual implementation would probably be as two separate UDP and IPv6 layers.

For illustration purposes, suppose speech information is being sent from VoIP phone 110 to UE 140. In such a situation, speech is referred to as being processed down protocol stack 200. At VoIP phone 110, speech is encoded in AMR layer 205 (via an AMR codec) to produce a speech frame 208 having speech bits. The speech bits are divided into three classes according to subjective or perceptual importance. The first class, i.e., class A bits, includes speech bits which are most sensitive to errors. Any error to class A bits typically results in a corrupted speech frame which should not be decoded without applying appropriate error concealment. The second class, i.e., class B bits, includes speech bits which are less sensitive to errors than the class A bits but more sensitive to errors than the third class, i.e., class C bits.

In RTP/RTCP layer 210, one or more speech frames 208 are encapsulated into an RTP packet with an RTP header that indicates a sequence number and a time stamp to aid in playing out the speech frames properly at the receiving end. In UDP/IPv6 layer 215, an IPv6 header and a UDP Lite header is added to the RTP packet to produce an UDP/IPv6 packet 218. That is, the UDP/IPv6 packet comprises a RTP/UDP/IPv6 header and the speech packet, wherein the RTP/UDP/IPv6 header includes the RTP, IPv6 and UDP headers. The IPv6 header includes information indicating an address for use in routing packets across a network. The UDP Lite header includes coverage field information and UDP checksum bits, such as Cyclical Redundancy Check (CRC) bits. The UDP checksum bits provide error detection to the header portion of the UDP/IPv6 packet (i.e., RTP/UDP/IPv6 header) and some or all of the bits in the speech packet. The coverage field information indicates a coverage field or bits in the UDP/IPv6 packet corresponding to the UDP checksum bits. For example, if the UDP checksum bits provide error protection only to the first half of the UDP/IPv6 packet, the coverage information will indicate the first half.

The UDP/IPv6 packet is sent from VoIP phone 110 through internet 105 to GGSN 120. From GGSN 120, the UDP/IPv6 packet is forwarded to core network 130. In core network 130, a Radio Access Bearer (RAB) is established for transporting the UDP/IPv6 packet from the edge of core network 130 to UE 140. The RAB is established using PDCP layer 220, RLC layer 225, MAC-d layer 230 and PHY layer 235. In the PS domain, the RAB includes one Radio Bearer (RB). The RB covers aspects of radio interface transport and physical bearer services for different levels of Quality of Service (QoS) options. The RB is configured by core network 130 to match requirements of services being supported for a user to which the RAB was established. Examples of service requirements include transmit time interval length of delay constraint, channel coding for proper error rates, determining whether to apply a CRC information, etc. The RB is configured through RLC layer 225, MAC-d layer 230 and PHY layer 235.

Upon receipt of the UDP/IPv6 packet by core network 130, the UDP/IPv6 packet is processed by RAN 160, RNC 170 and Node B 180. Specifically, in PDCP layer 220, the RTP/UDP/IPv6 header is compressed to form a compressed header. The output of PDCP layer 220 is a PDCP packet 228 comprising the compressed header and the speech packet. Operating in Unacknowledged Mode (UM), RLC layer 225 determines whether to segment the PDCP packet, concatenate the PDCP packet with another PDCP packet (or part thereof), or do neither segmentation nor concatenation. RLC layer 225 adds a RLC UM header to the unaltered, segmented or concatenated PDCP packet to produce an RLC packet, wherein the RLC UM header includes a sequence number.

In MAC-d layer 230, a transport format is selected depending on the existence of speech or data. The output of MAC-d layer 230 is a MAC-d packet. In PHY layer 235, error detection and/or error protection are added to the MAC-d packet to produce a PHY packet. Error detection being added in the form of PHY checksum bits, which provides error detection to the entire MAC-d packet. Error protection being provided via one or more various techniques, such as convolution coding, turbo coding, rate matching, interleaving, etc. The PHY packet is subsequently further processed, e.g., RF modulated, by Node B 180 for transmission to UE 140. At UE 140, the PHY packet is processed up protocol stack 200, i.e., reverse order, to obtain decoded speech.

In UMTS, PHY layer transport may be through Dedicated CHannel (DCH) or High Speed Data Packet Access/Enhanced Uplink Dedicated CHannel (HSDPA/EUDCH). In the case where PHY layer transport is via DCH, no error detection is performed by UE 140 at PHY layer 235. That is, even if the PHY packet is received with errors, the PHY packet will be processed and sent up protocol stack 200 with the errors. To reduce the error rate, Node B 180 may increase the power at which the PHY packets are transmitted to UE 140. Increasing the transmit power, however, decreases system capacity by reducing overall power available for transmissions to other UEs.

In the case where PHY layer transport is via HSDPA/EUDCH, if no error is detected in the received PHY packet using the PHY checksum bits at UE 140, then UE 140 transmits an acknowledgement (ACK) to Node B 180 indicating that the PHY packet was successfully received. On the other hand, if an error is detected in the PHY packet using the PHY checksum bits, then UE 140 transmits a negative acknowledgement (NACK) to the Node B 180 indicating that the PHY packet was received with errors. Upon receipt of the NACK, Node B 180 retransmits the PHY packet to UE 140. This process of transmitting a NACK and retransmitting the PHY packet will continue until either an error free PHY packet is received by UE 140, or a maximum allowable numbers of retransmissions have been met or exceeded.

Retransmissions are undesirable for at least two reasons. First, retransmissions utilizes transmit power which reduces the amount of overall transmit power available for transmissions to other UEs, thereby reducing system capacity. Second, retransmissions introduce delay between the reception of the speech packets (or PHY packets) which adversely affects speech quality. To reduce the number of retransmissions, higher power levels may be used for initial transmissions (and/or retransmissions) such that a low error rate can be achieved. However, using higher power levels for initial transmissions (and retransmissions) would also reduce the amount of overall transmit power available for transmissions to other UEs, which, in turn, reduces system capacity.

Accordingly, there exists a need for reducing the number of retransmissions and reducing transmit power levels associated with VoIP.

SUMMARY OF THE INVENTION

The present invention is a method and system for providing Voice over Internet Protocol (VoIP) in a wireless communications system using a Packet Data Conversion Protocol (PDCP) with enhanced functionality that allows sub-packets to be processed for transmission over different Radio Bearers (RB) with unequal or different levels of error protection and/or error detection based on perceptual importance of the bits in the sub-packets. The enhanced PDCP of the present invention being operable to partition a packet into a plurality of sub-packets such that different levels of error protection and/or error detection may be applied to the packet. An overall gain in system capacity can be expected due to transmit power savings provided via unequal error detection and error protection.

The present invention comprises the steps of partitioning a packet into a plurality of sub-packets based on coverage field indicated in transport header information, and applying different levels of error protection and/or error detection to each of the sub-packets. One example of transport layer header information being the well-known User Datagram Protocol (UDP) Lite header. The different levels of error protection and error detection would depend upon perceptual importance of the bits contained within a particular sub-packet. In one embodiment, the packet is partitioned into a first and second sub-packet. The first sub-packet containing the bits corresponding to the coverage field, such as header and Class A bits, and having error detection applied thereto. The second sub-packet containing the bits outside the coverage field, such as Class B and C bits, and not having any error detection applied thereto. In another embodiment, the first and second sub-packets are associated with sub-queues belonging to a same queue. The sub-packets associated with sub-queues belonging to a same queue are then provided simultaneously to a physical layer for the application of error protection and/or error detection.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is a method and system for providing Voice over Internet Protocol (VoIP) in a wireless communications system using a Packet Data Conversion Protocol (PDCP) with enhanced functionality that allows sub-packets to be processed for transmission over different Radio Bearers (RB) with unequal or different levels of error protection and/or error detection based on perceptual importance of the bits in the sub-packets. The enhanced PDCP of the present invention being operable to partition a packet into a plurality of sub-packets such that different levels of error protection and/or error detection may be applied to the packet.

For ease of discussion, the present invention will be described herein with respect to the well-known Universal Mobile Telecommunications System (UMTS) based wireless communications system. This should not be construed to limit the present invention to UMTS based wireless communications system. It would be apparent to one of ordinary skill in the art to apply the present invention to wireless communications systems based on other multiple access techniques, such as Code Division Multiple Access 2000 (CDMA2000).

Figure 1:
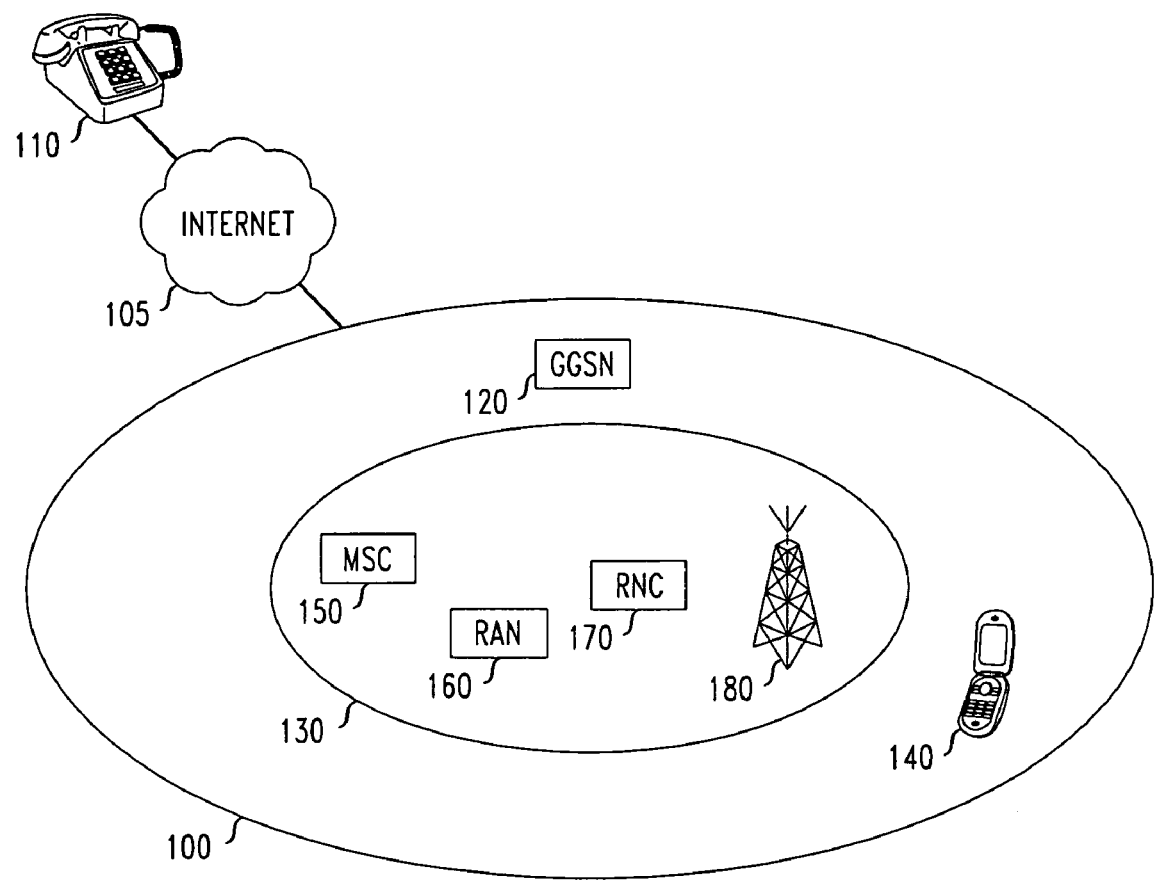
FIG. 1 depicts a UMTS based wireless communications system, internet and a VoIP phone in accordance with the prior art.
Figure 2:
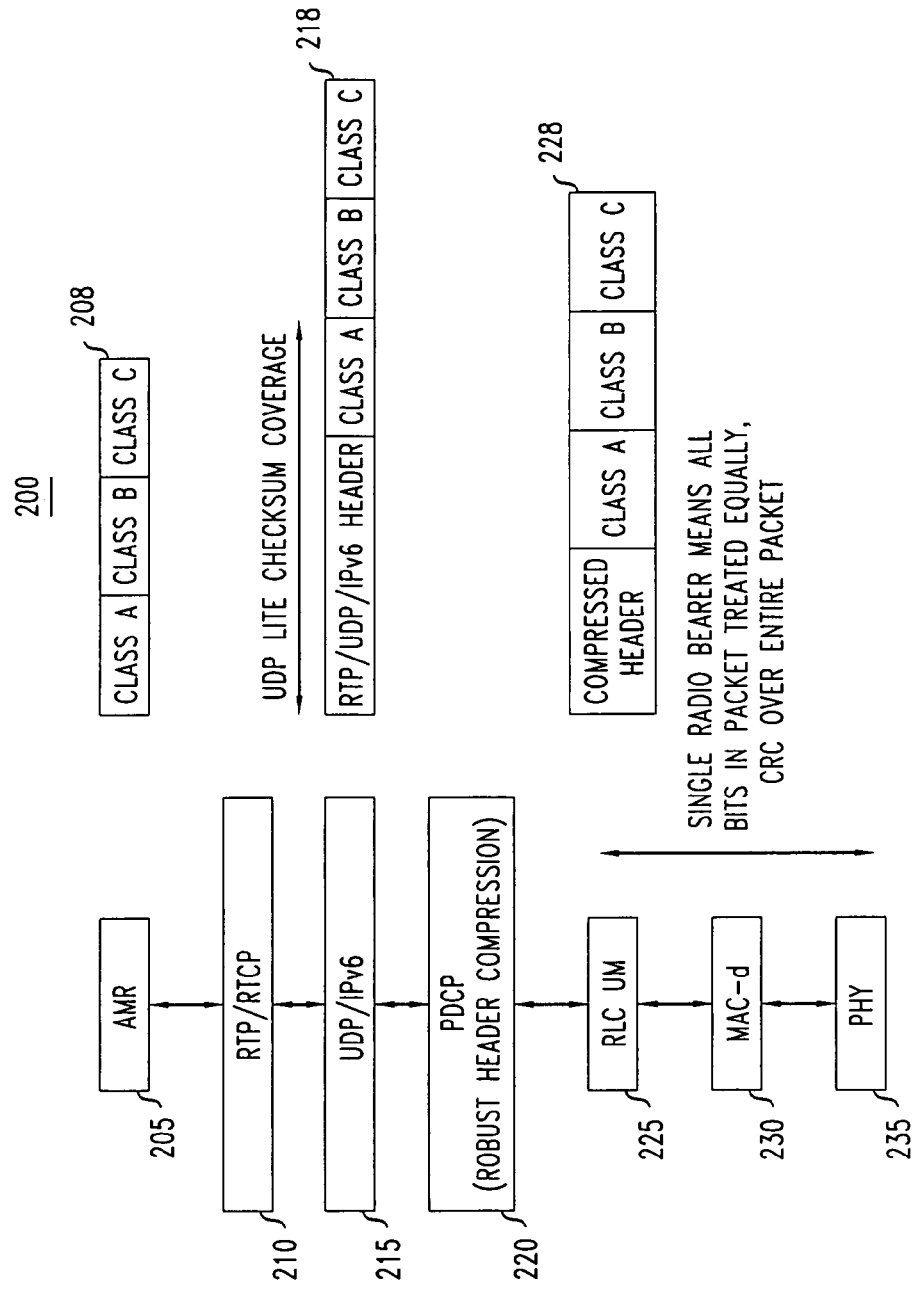
FIG. 2 depicts a protocol stack used for a VoIP call between VoIP phone and UE in accordance with the prior art.
Figure 3:
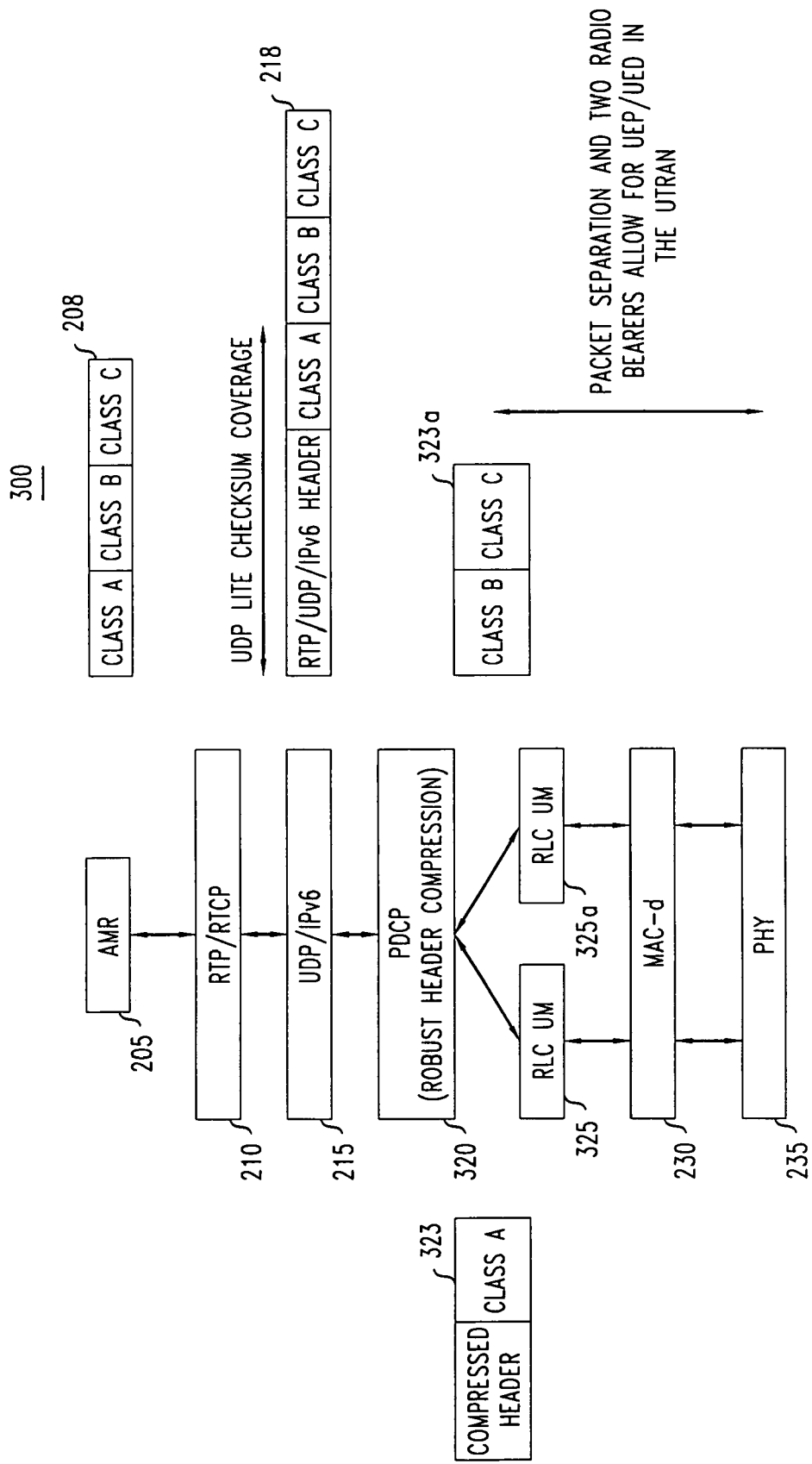
FIG. 3 depicts a protocol stack used for a VoIP call between VoIP phone and UE in accordance with one embodiment of the present invention in which physical layer transport is through DCH.

The present invention can be implemented in a wireless communications system in which physical layer transport is through Dedicated CHannel (DCH), or in which physical layer transport is through High Speed Data Packet Access (HSDPA) or Enhanced Uplink Dedicated CHannel (EUDCH). FIG. 3 depicts a protocol stack 300 used for a VoIP call between VoIP phone 110 and UE 140 in accordance with one embodiment of the present invention in which physical layer transport is through DCH. The VoIP call being processed in the PS domain of UMTS-based wireless communications system 100. As shown in FIG. 3, protocol stack 300 includes Adaptive Multi-Rate (AMR) layer 205, Real Time Protocol/Real Time Control Protocol layer 210, UDP/Internet Protocol version 6 (UDP/IPv6) layer 215, enhanced Packet Data Convergence Protocol (PDCP) layer 320, Radio Link Control (RLC) layers 325, 325a, dedicated channel Medium Access Control (MAC-d) layer 230 and Physical (PHY) layer 235.

For purposes of discussion, present invention will first be described with respect to speech information being sent from VoIP phone 110 to UE 140, i.e., transmitter side. Processing of a speech frame from AMR layer 205 through RTP/RTCP layer 210 and UDP/IPv6 layer 215 would be the same as described in the background section for protocol stack 200. In UDP/IPv6 layer 215, a UDP Lite header and a IPv6 header are added to a RTP packet to produce a UDP/IPv6 packet 218, wherein the RTP packet includes a RTP header and a speech packet. The RTP header, UDP Lite header and IPv6 header are collectively referred to herein as a RTP/UDP/IPv6 header. The UDP Lite header includes UDP checksum bits, such as Cyclical Redundancy Check (CRC) bits, and coverage field information. The UDP checksum bits providing error detection to the RTP/UDP/IPv6 header and some or all of the bits in the speech packet. The coverage field information indicates a coverage field or bits in the UDP/IPv6 packet corresponding to the UDP checksum bits.

In a preferred embodiment, the UDP checksum bits provide error detection to a coverage field including the RTP/UDP/IPv6 header and Class A bits. In another embodiment, the UDP checksum bits provide error detection to a coverage field including the RTP/UDP/IPv6 header, Class A bits and Class B bits. In yet another embodiment, the UDP checksum bits provide error detection to a coverage field including only the RTP/UDP/IPv6 header. For discussion purposes only, the present invention will be described hereinafter with reference to the preferred embodiment in which the UDP checksum bits provide error detection to a coverage field including the RTP/UDP/IPv6 header and Class A bits.

In enhanced PDCP layer 320, the UDP Lite portion of the RTP/UDP/IPv6 header is analyzed to determine the coverage field. The UDP/IPv6 packet is partitioned into a first and second sub-packet 323, 323a based on the coverage field. Specifically, the UDP/IPv6 packet is partitioned such that bits corresponding to the coverage field (e.g., RTP/UDP/IPv6 header and Class A bits) are placed into the first sub-packet 323 and all other bits are placed into the second sub-packet 323a. In one embodiment, some bits may be placed in both sub-packets, or the UDP/IPv6 packet may be partitioned into three or more sub-packets (i.e., more than two RBs for a single RAB may be possible).

From enhanced PDCP layer 320, the first and second sub-packets 323, 323a are processed by a first and second RB. The first and second RB being configured using RLC layers 325, 325a, MAC-d layer 230 and PHY layer 235 by core network 130 to match requirements of services being supported. In particular, the first RB would be configured to provide a higher level of error protection and/or error detection to the first sub-packet than a level of error protection and/or error detection provided by the second RB to the second sub-packet. In a preferred embodiment, no error detection is added to the sub-packet containing the lesser perceptually important bits. That is, error detection is added to the first sub-packet but not the second sub-packet. For example, the first RB adds PHY checksum bits (e.g., CRC) and uses a rate matching attribute of 200 for the first sub-packet, but the second RB uses a rate matching attribute of 190 for the second sub-packet but does not add any PHY checksum bits.

After the first and second sub-packets are processed by their respective RBs, the first and second sub-packets are transmitted by Node B 180 to UE 140. At UE 140, i.e., receiver side, the first and second sub-packets are processed up protocol stack 300 to obtain decoded speech. Upon receiving the sub-packets, in PHY layer 235, only the first sub-packet is checked for errors using the PHY checksum bits. The result of the error check is used to control transmit power levels at Node B 180. As the error rate for the first sub-packet increases, Node B 180 may increase its transmit power to UE 140. Conversely, as the error rate for the first sub-packet decreases, Node B 180 may decrease its transmit power to UE 140. By using a higher level of error protection for the first sub-packet, a desired error rate may be maintained for the more perceptually important bits contained within the first sub-packet while transmitting at a lower transmit power.

Note that the second sub-packet is not checked for errors (since no error detection was applied to it at the transmitter side). Advantageously, errors in received second sub-packets are not included in the error rate calculation used for controlling transmit power at Node B 180. Accordingly, the second sub-packet can also be transmitted at a lower transmit power because errors can be tolerated for the lesser perceptually important bits contained within, and an overall gain in system capacity can be expected.

In enhanced PDCP layer 320, the first and second sub-packets are combined to form a reassembled packet. The reassembled packet is subsequently delivered to UDP/IPv6 layer 215 where the UDP checksum bits are used to check for errors in the bits corresponding to the coverage field, e.g., RTP/UDP/IPv6 header and Class A bits. Any errors in these bits would cause UDP/IPv6 layer 215 to discard the reassembled packet. However, any error to bits outside the coverage field, e.g., Class B and C bits, would not cause UDP/IPv6 layer 215 to discard the reassembled packet. Thus, so long as there are no errors in the bits corresponding to the coverage field, the reassembled package will be passed to the AMR codec via RTP/RTCP layer 210.

As mentioned earlier, the present invention can also be implemented in a wireless communications system in which physical layer transport is through HSDPA or EUDCH. Processing of multiple sub-packets using HSDPA or EUDCH as the physical transport layer requires the sub-packets to be delivered at the same time (e.g., together) to the PDCP layer for reassembly. The present invention meets this requirement using priority sub-queues that ensures all the sub-packets belonging to a same packet are simultaneously delivered to the PDCP layer.

Figure 4:
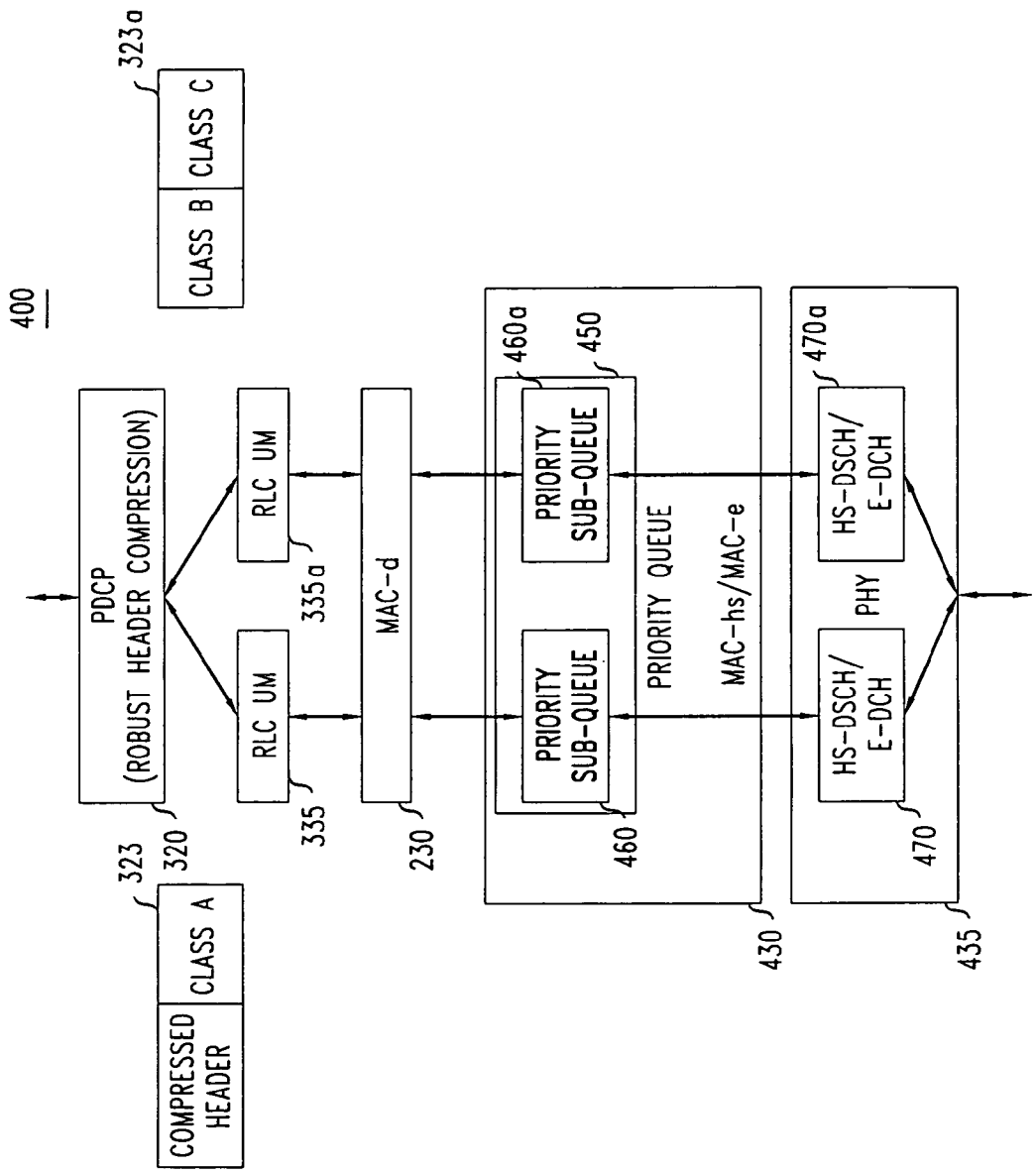
FIG. 4 depicts a protocol stack used for a VoIP call between VoIP phone and UE in accordance with one embodiment of the present invention in which physical layer transport is through HSDPA or EUDCH.

FIG. 4 depicts a protocol stack 400 used for a VoIP call between VoIP phone 110 and UE 140 in accordance with one embodiment of the present invention in which physical layer transport is through HSDPA or EUDCH. Protocol stack 400 includes enhanced Packet Data Convergence Protocol (PDCP) layer 320, Radio Link Control (RLC) layers 325, 325a, dedicated channel Medium Access Control (MAC-d) layer 230, high speed or enhanced MAC (MAC-hs/MAC-e) layer 430, and enhanced Physical (PHY) layer 435. MAC-hs/MAC-e layer 430 being implemented in Node B 180 and configured for HSDPA/EUDCH. MAC-hs/MAC-e layer 430 having a priority queue 450, which includes priority a plurality of sub-queues 460, 460a. Enhanced PHY layer 435 including a plurality of HS-DSCH/E-DCH 470, 470a in which error protection and/or error detection are applied. Protocol stack 400 further includes, but not shown in FIG. 4, an AMR layer, a RTP/RTCP layer and an UDP/IPv6 layer.

Processing of a speech frame from the AMR layer through the RTP/RTCP layer, UDP/IPv6 layer, enhanced PDCP layer 320, and MAC-d layer 230 would be identical as described for physical layer transport through DCH. From enhanced PDCP layer 320, sub-packets from multiple radio bearer flow through RLC layer 325, 325a into MAC-d layer 230 into MAC-hs/MAC-e layer 430. In MAC-hs/MAC-e layer 430, the sub-packets will enter a same priority queue 450 where they will be placed into separate priority sub-queues 460, 460a. When a particular priority queue 450 is to be serviced or scheduled, the sub-packets associated with the priority sub-queues 460, 460a belonging to the priority queue 450 being service will be delivered simultaneously (or together) in a MAC-hs/MAC-e packet for transport channel processing. That is, the sub-packets belonging to a same priority queue will be sent at the same time or successively to enhanced PHY layer 435. In the enhanced PHY layer 435, different levels of error protection and/or error detection will be applied to the first and second sub-packets through the plurality of HS-DSCH/E-DCH 470, 470a. In particular, a higher level of error protection and/or error detection will be applied to the first sub-packet than the portion corresponding to the second sub-packet. In one embodiment, the PHY layer will concatenate the sub-packets into a concatenated PHY packet for delivery across the air interface to the peer PHY layer at UE 140. By concatenating the two sub-packets into a concatenated PHY packet, the first and second sub-packets can be delivered simultaneously to UE 140 for decoding. At the receiver side, the concatenated PHY packet is processed up protocol stack 400 in a manner similar to that described for protocol stack 300 (with the modifications for protocol stack 400).

In a preferred embodiment, at the transmitter side, in addition to a higher level of error protection, error detection will be applied to the first sub-packet but not to the second sub-packet at enhanced PHY layer 435. That is, error detection is added to the sub-packet containing the more perceptually important bits and not to the lesser perceptual bits. At the receiver side, only the first sub-packet is checked for errors (since the first sub-packet has error detection and the second sub-packet does not have error detection). If there are no errors with respect to the first sub-packet, UE 140 transmits an ACKnowledgement (ACK) to Node B 180. Otherwise, UE 140 transmits a Negative ACKnowledgement to Node B 180 which causes Node B 180 to retransmit the first sub-packet. This process of checking the first sub-packet for errors and retransmitting the first sub-packet continues until an error free first sub-packet is received at UE 140 or a maximum number of retransmission attempts have been met or exceeded. Once an error free first sub-packet is received or the maximum number of retransmission attempts has been met, the first and second sub-packet will be sent up protocol stack 400 where the two sub-packets are combined in enhanced PDCP layer 320 into a reassembled packet. The rest of the processing on the receiver side up protocol stack 400 would be the same as for protocol stack 300.

Recall that the second sub-packet is not checked for errors. Thus, regardless of whether the second sub-packet is received with or without errors, there will be no retransmission of the second sub-packet. This technique of the present invention provides transmit power savings which will result in an overall gain in system capacity.

Although the present invention has been described in considerable detail with reference to certain embodiments, other versions are possible. For example, transport layer headers other than UDP Lite headers may be used. Speech encoders other than AMR may be used. Further, applications other than speech may be used. Therefore, the spirit and scope of the present invention should not be limited to the description of the embodiments contained herein.

The invention claimed is:

1. A method of processing a plurality of sub-packets comprising the steps of:
   receiving a first and a second sub-packet, wherein the first sub-packet was coded with a higher level of error protection than the second sub-packet, and the first sub-packet includes error detection information, and the first and second sub-packets are processed over respective different radio bearers;
   checking the first sub-packet for errors using the error detection information; and combining the first and second sub-packets to form a packet
   and, prior to the step of combining, checking the first sub-packet for errors;
   transmitting an acknowledgement message if the first sub-packet did not include errors;
   transmitting a negative acknowledgement message if the first sub-packet included errors; and
   receiving a re-transmitted first sub-packet if a previous reception of the first sub-packet included bits with errors.

2. The method of claim 1, wherein the first and second sub-packets include speech information and were received over a wireless communications link.

3. The method of claim 2, wherein the first sub-packet includes error detection information and the second sub-packet does not include error detection information.

4. The method of claim 1, wherein the first sub-packet includes bits corresponding to a coverage field indicated in the transport header information and the second sub-packet including bits not corresponding to the coverage field.

* * * * *